United States Patent [19]
Inoue et al.

[11] Patent Number: 6,061,522
[45] Date of Patent: May 9, 2000

[54] FLASH LAMP USABLE BOTH AS A MAIN AND AS A SLAVE AND CONNECTOR THEREFOR TO AN UNDERWATER CAMERA

[76] Inventors: Akihide Inoue, 3-9-6 Dai, Kamakura, Kanagawa 247; Yoshiyuki Takematsu, 8-8-14-303 Nishigotanda, Shinagawa-ku Tokyo, both of Japan

[21] Appl. No.: 09/107,776

[22] Filed: Jun. 30, 1998

[30] Foreign Application Priority Data

Feb. 19, 1998 [JP] Japan ................... 10-037845

[51] Int. Cl.[7] ................... G03B 17/08
[52] U.S. Cl. ................... 396/28; 396/25; 396/267
[58] Field of Search ................... 396/25, 28, 267

[56] References Cited

U.S. PATENT DOCUMENTS

| | | | |
|---|---|---|---|
| 4,012,749 | 3/1977 | Numata | 396/28 |
| 4,252,426 | 2/1981 | Kuraishi | 396/28 |
| 4,492,451 | 1/1985 | Maassen et al. | 396/267 |

*Primary Examiner*—Russell Adams
*Attorney, Agent, or Firm*—Majestic, Parsons, Siebert & Hsue P.C.

[57] ABSTRACT

A camera for underwater photography may be used together with one or more flash lamps each capable of serving both as a main lamp and as a slave. The camera is connected through its housing to a main lamp by way of an optical cable and when it is clicked, a control signal is emitted as a light signal and transmitted to the main lamp through the optical cable. The flash lamp has a photosensing unit for receiving a light signal and converting it into an electrical signal. A signal conversion circuit further converts this signal into a flash control signal by which the lamp flashes light. The photosensing unit is connected to the optical cable through a connector and receives light only through the cable when the connector is attached to it. When the lamp is used as a slave, the connector for the optical cable is detached from the photosensing unit and external light received through a transparent window is converted into an electrical signal for the emission of flash light.

5 Claims, 5 Drawing Sheets

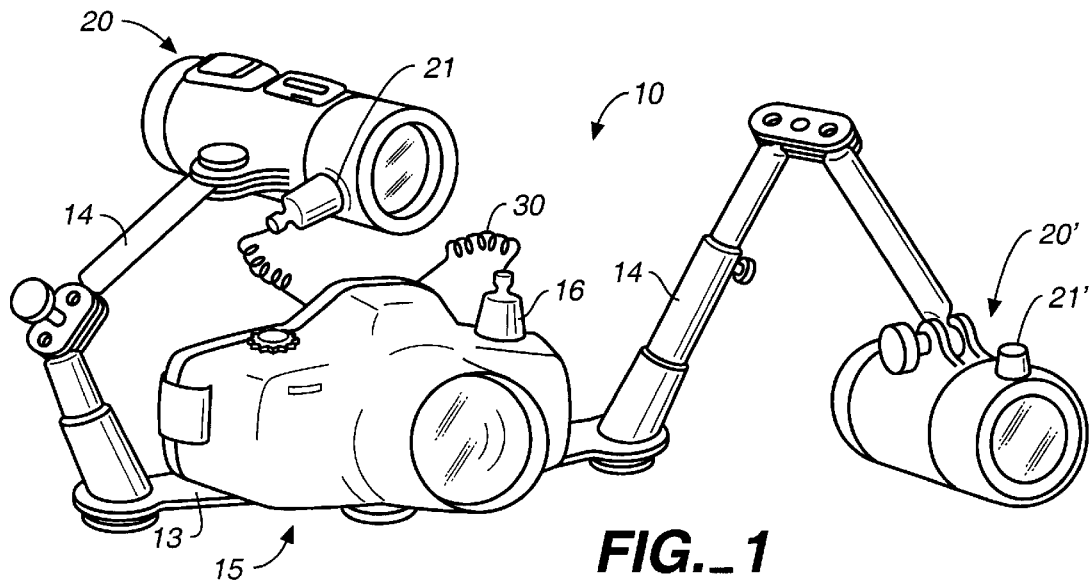
FIG._1
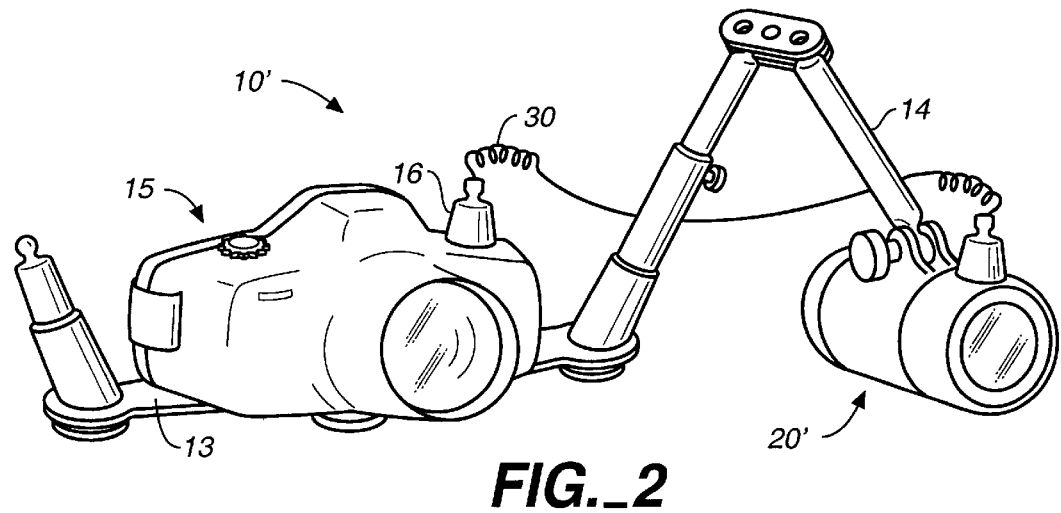
FIG._2

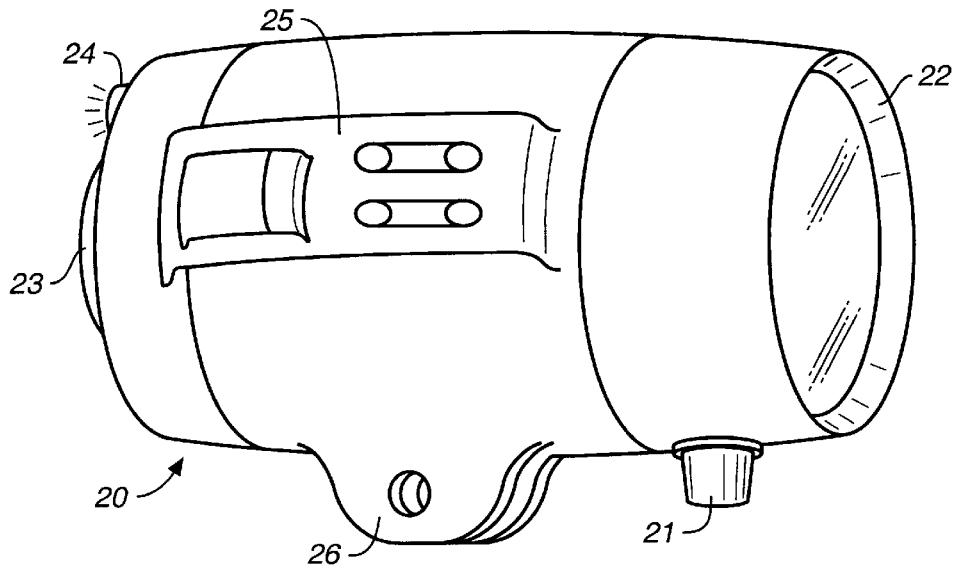
FIG._3
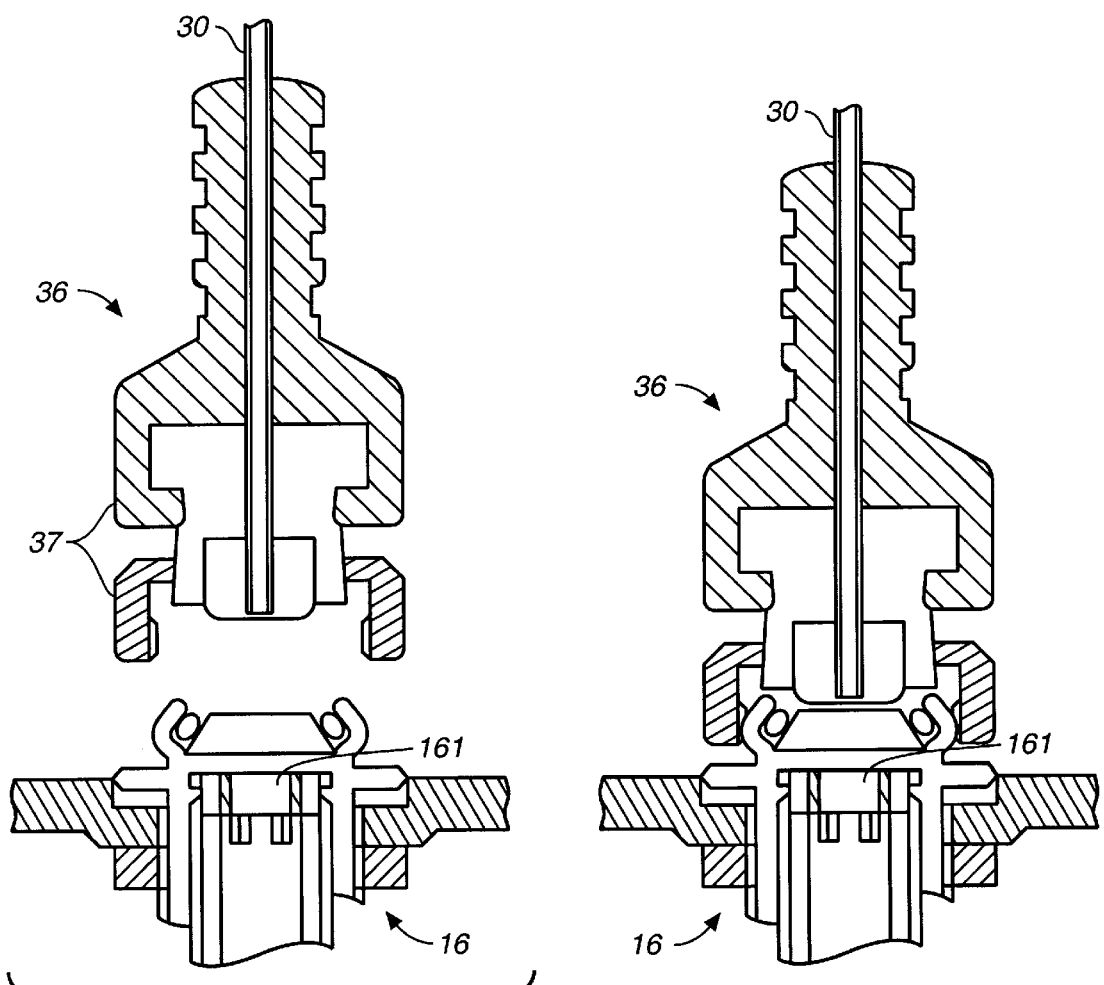
FIG._5A  FIG._5B

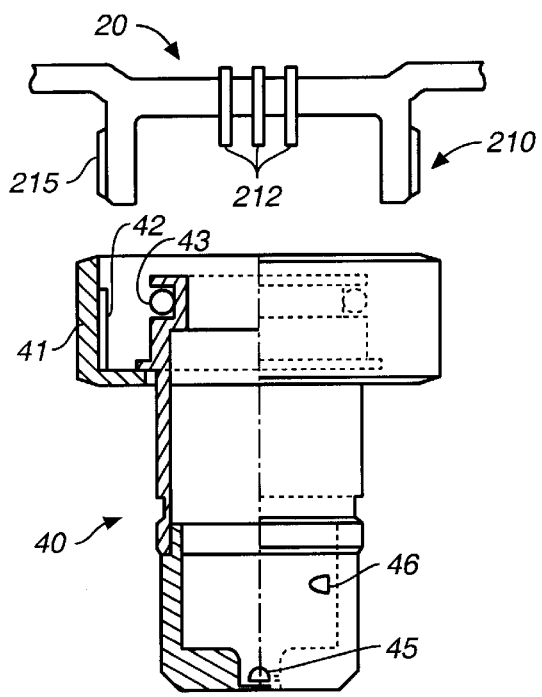
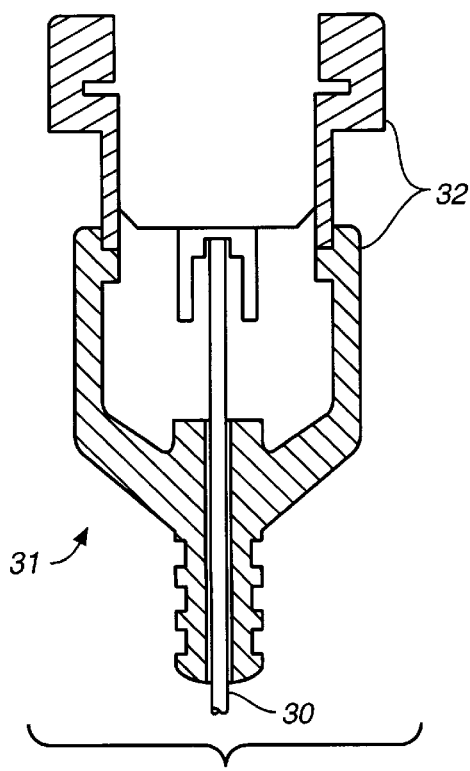
FIG._4A
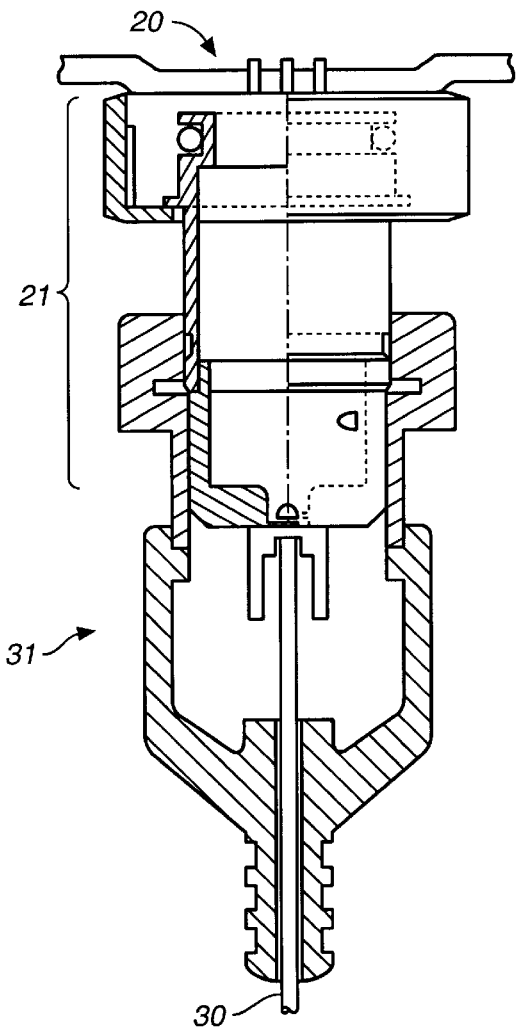
FIG._4B

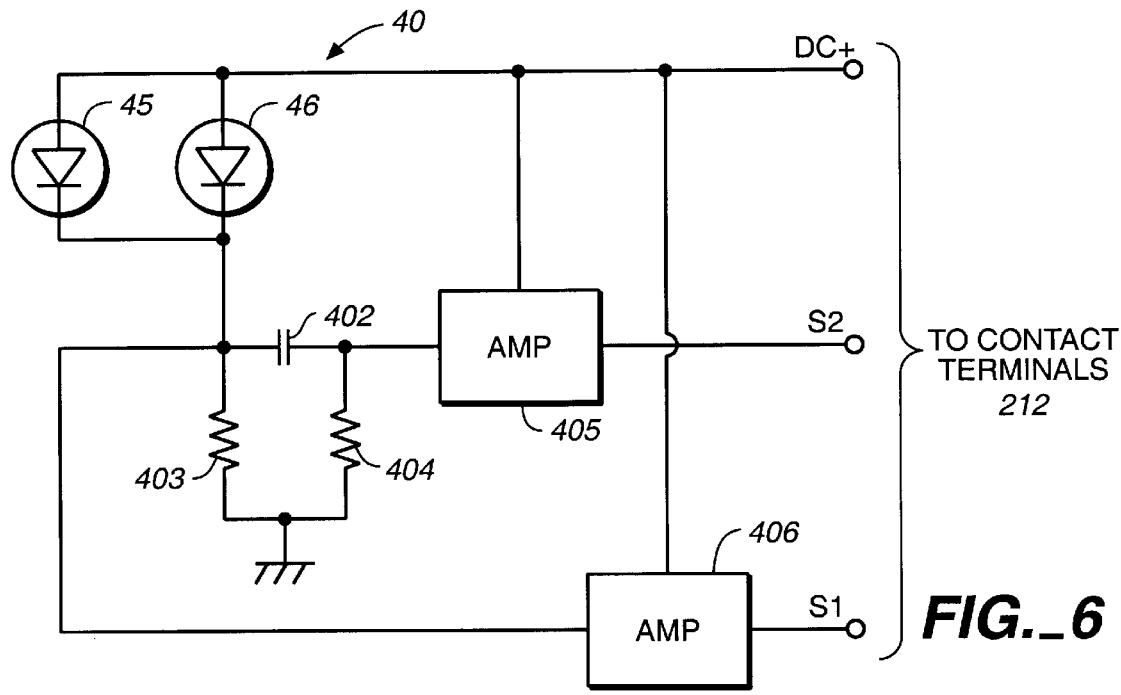
FIG._6
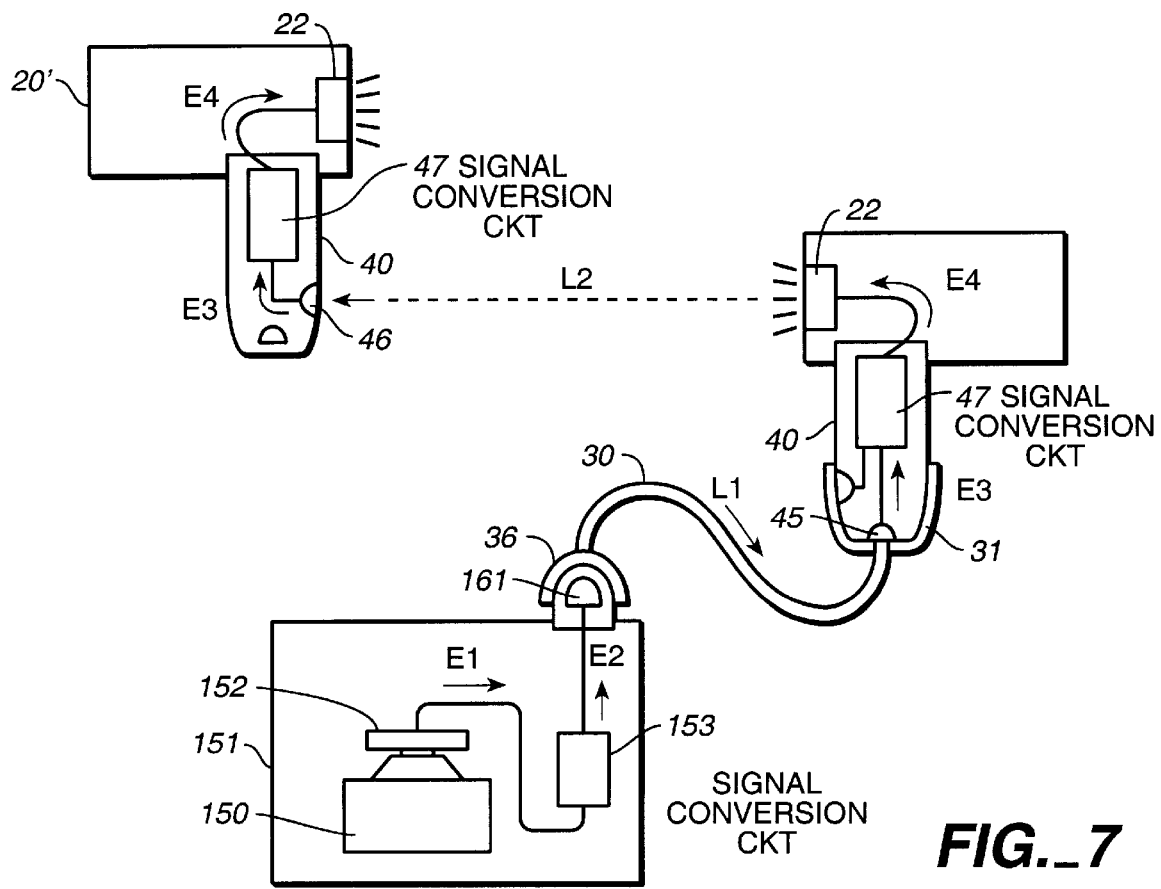
FIG._7

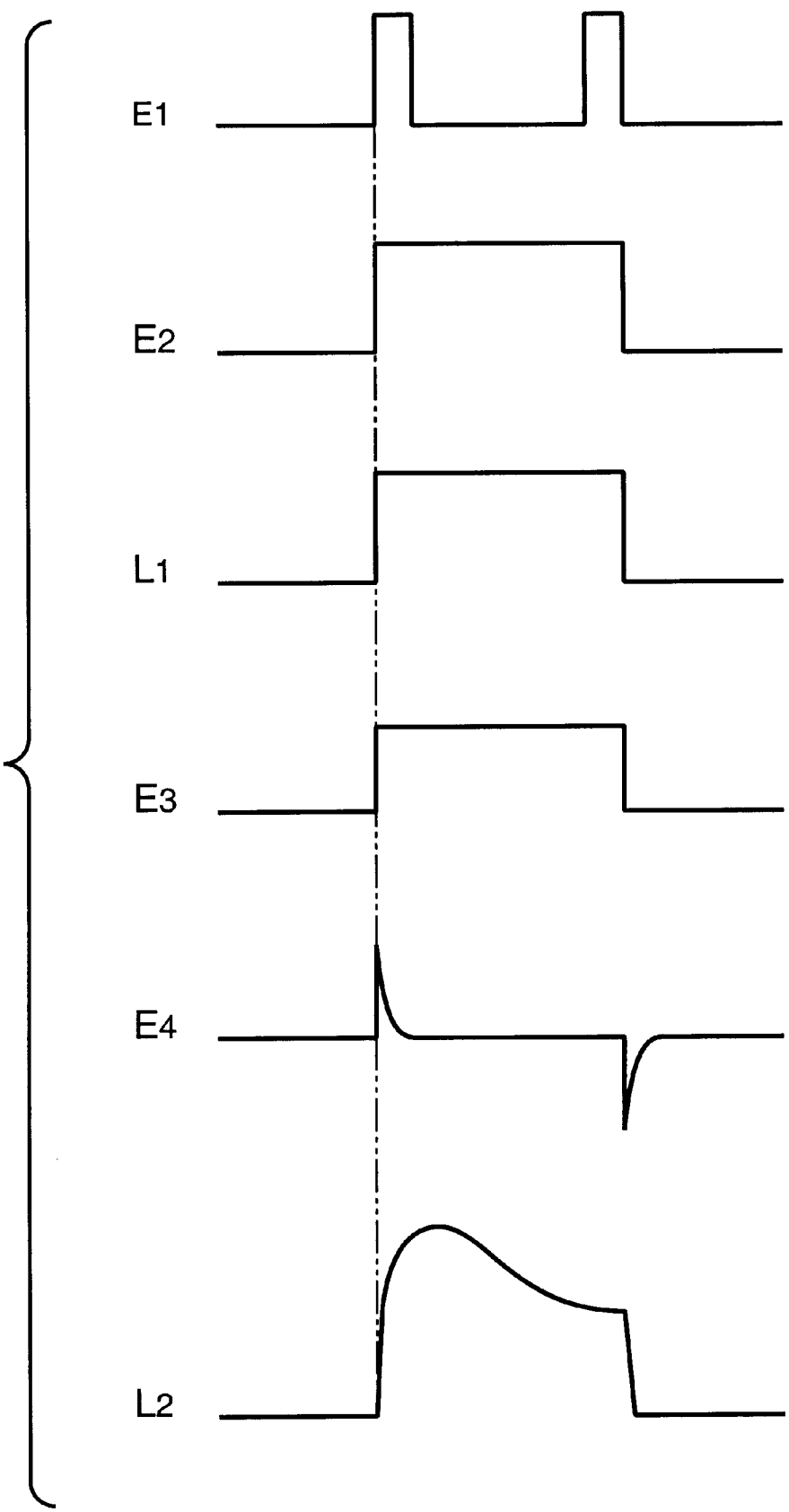
FIG._8

FLASH LAMP USABLE BOTH AS A MAIN AND AS A SLAVE AND CONNECTOR THEREFOR TO AN UNDERWATER CAMERA

BACKGROUND OF THE INVENTION

This invention relates to a photosensitive stroboscopic or flash lamp which can be used both as a main lamp (herein referred to simply as "the main") and as a slave, and also to a system for optically connecting such a lamp to an underwater camera.

In underwater photography, the use of a flash lamp is nearly indispensable because of the insufficiency of available light. Such a flash lamp for underwater photography (herein referred to simply as "the flash lamp") is usually attached to the tip of an elongated arm member extending from a base plate fastened to the bottom of an underwater camera (herein referred to simply as "the camera") such that its position can be varied for different ways of lighting, depending on the conditions of the situation when the camera is used as well as the effects desired. When it is desired to photograph a target object as accurately as possible or without any shadows, the lamp may be placed in front somewhat above the camera. If some shadows are desired, say, for emphasizing a contrast, the lamp may be placed at a relatively low position on the right-hand or left-hand side of the camera.

With a front lighting, however, the picture tends to be too flat. Similarly, the shadows may become too dark and the picture as a whole may become too somber if the lighting is only from one side. Since the use of only one flash lamp is thus not versatile enough, two flash lamps, including one master and one slave, are often attached to the camera for two-lamp stroboscopic photography. To use such a system for underwater photography, however, the preliminary preparation has been very cumbersome because the functions of the lamps must be preliminarily determined and the lamps must be connected to the camera by means of a water-proof cable for transmission of electrical signals. The basic problem was that the exchange of signals between the camera and the lamp was through electrical connections through a cable. Thus, it was absolutely impossible to set or reset a camera-lamp combination at the very time of underwater photography. Even on a boat, such operations must be carried out inside a cabin where the parts will not be exposed to water. In other words, the setting and resetting of such a system could be done safely only after the user returned to the land.

There are flash lamps of a special kind which may be used as a slave, having a light receiving sensor on the light emitting front surface and being adapted to be used with a master such that when the master emits light, the slave senses it and emits light substantially simultaneously. In such a system, the master and the slave may be considered as being optically connected and since they do not have to be connected by an electrical signal cable, they are convenient for underwater flash photography requiring a plurality of light sources.

With prior art flash lamps adapted to serve both as a main and as a slave, however, the optical link to a camera was not accurate enough. For example, although they could emit light in response to a signal from a camera, they could not reliably respond to a signal from the camera to stop the emission of light. This means that prior art flash lamps were not necessarily capable of providing the right level of exposure required by the camera. When such a lamp was used as the master, furthermore, the exchange of signals with the camera was still through an electrical connection. In other words, prior art lamps were subject to all kinds of limitations when used for underwater photography.

SUMMARY OF THE INVENTION

It is therefore an object of this invention to eliminate these problems of prior art technology of underwater photography relying on electrical connections through electrical signal cables between a camera and one or more flash lamps.

It is a more specific object of this invention to provide a flash lamp which can be more reliably connected to a camera optically whether it is being used as a master or as a slave and is capable of providing a specified exposure required by the camera although not connected by an electric signal cable.

It is another object of this invention to provide an optical connector for connecting such a flash lamp with a camera to form an optically connected system of a camera and a flash lamp for underwater photography with which the lighting mode and the system structure can be modified easily even at the moment of actual underwater photography.

A flash lamp embodying this invention, with which the above and other objects can be accomplished, may be characterized as comprising not only a flash light outputting part from which flash light is outputted but also a photosensing unit through which optical signals can be received and the received light signals can be converted into electrical signals to control the flash light outputting part. The photosensing unit has one or more light sensors and when the lamp is being used as a main and is connected to the camera unit through an optical cable for transmitting optical signals therethrough, a connector between the cable and the photosensing unit is so attached that the photosensing unit can detect only light received through the optical cable. When the cable is removed and the lamp is being used as a slave, the photosensing unit can receive light from outside through a transparent window.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a schematic overall view of a system with an underwater camera with two flash lamps connected thereto for underwater photography;

FIG. 2 is a schematic overall view of the system of FIG. 1 when it is being used without a slave;

FIG. 3 is an external view of a flash lamp embodying this invention;

FIGS. 4A and 4B are sectional views of the photosensing unit when it is and is not attached to the connector part of the flash lamp and to one end of the optical cable;

FIGS. 5A and 5B are sectional views of the connector on the optical cable and the optical signal transmitting part of the camera when they are and are not connected to each other;

FIG. 6 is a circuit diagram of the photosensing unit;

FIG. 7 is a block diagram of the system of FIG. 1, indicating the travel route of signals from the camera to the lamps; and FIG. 8 is a signal diagram for showing forms of electrical and optical signals along their travel route shown in FIG. 7.

Throughout herein, like components are indicated by the same symbol whether or not they are components of different embodiments, and they may not be explained repetitiously.

DETAILED DESCRIPTION OF THE INVENTION

The invention is described next by way of examples with reference to the figures. FIG. 1 shows a system 10 with an underwater camera unit 15 (including a camera and a housing therefor) with two identically structured light-sensitive flash lamps 20 and 20' embodying this invention (herein referred to as "the first lamp 20" and "the second lamp 20'" for identification) each usable both as a master and as a slave. Each of these lamps 20 and 20' is attached to a base plate 13 fastened to the bottom of the camera unit 15 through an elongated articulated structure herein referred to as an arm member 14. The first lamp 20 is connected to the camera unit 15 through an optical cable 30 and functions as a master. The second lamp 20' is not connected to the camera 15 with such a liking mechanism and is adapted to function as a slave.

The camera unit 15 includes a camera such as a single lens reflex camera. When the shutter of the camera is opened, an optical control signal is transmitted from an output port 16 through the camera housing and the optical cable 30 to an input port 21 of the first lamp 20. The input port 21 of the first lamp 20 serves to convert the received optical signal into an electrical signal and to transmit this converted electrical signal to a signal conversion circuit (not shown) inside the lamp 20, causing flash light to be emitted from the lamp 20. The input port 21 of the first lamp 20 is completely covered by a terminal connector of the optical cable 30 and is thereby prevented from receiving any light except through the cable 30. This is how the first lamp 20 is made to function as a master.

Although the second lamp 20' is not directly connected to the camera unit 15, its input port 21' on its frontal part is exposed to the exterior and hence is capable of receiving the flash light emitted from the first lamp 20. When the light from the first lamp 20 is thus received, the input port 21' converts it into an electrical signal and transmits it to its signal conversion circuit (not shown), causing flash light to be emitted from the second lamp 20'. Since this happens instantaneously, the second lamp 20' can serve as a slave, emitting light substantially simultaneously with the first lamp 20 which serves as the master.

After 2–3 milliseconds, when an appropriate exposure required by the camera has been made, an optical stop signal is similarly outputted from the camera, and this control signal is similarly transmitted (as will be described more in detail below with reference to FIGS. 6–8), instantaneously stopping the emission of light from both lamps 20 and 20'.

A system as described above with reference to FIG. 1 is useful also when a wide-angle lens is being used because a single flash lamp is usually not capable of covering a large enough angle to sufficiently illuminate all the objects in the field of vision of the wide-angle lens. If two flash lamps are used to provide lighting from both sides of the camera, it is possible to nearly uniformly illuminate the entire field of vision and to take a good picture, for example, of a large object or a large group of fish.

FIG. 2 shows how the system 10, as described above, can be used as a simpler system 10' because it frequently happens to an underwater photographer that an interesting small sea animal crawls into a narrow space between rocks at the bottom of a sea. In such a situation, a system as shown in FIG. 1 with two lamps may be difficult to handle, but the user can remove the first lamp 20, temporarily leave it somewhere on a safe place nearby and reattach the cable 30 to the second lamp 20' having a longer arm, as shown in FIG. 2, to form a more compact system 10'. The second lamp 20', like the first lamp 20 shown in FIG. 1, is adapted to function not only as a slave but also as a master, as explained above. With the cable 30 thus reattached as shown in FIG. 2, the second lamp 20' now functions as a master, that is, the optical signals from the camera unit 15 are received thereby through its input port 21' which is now so connected as to receive light only through the cable 30.

The structure of a flash lamp embodying this invention will be explained next more in detail. For convenience, only the first lamp 20 will be described because the second lamp 20' is structurally the same as the first lamp 20.

As shown in FIG. 3, the lamp 20 according to this invention is characterized as having not only the input port 21 but also a light-emitting unit 22 on its frontal part, an opening 23 for battery exchange and an indicator lamp 24 for indicating the charged condition of the battery on the back side and an input part 25 and an attaching part 26. The input part 25 may include a luminosity switch and a power switch and is a part on which the user can select various functions of the lamp 20. The attaching part 26 is a part at which the arm member 14 is adapted to be fastened.

The input port 21 is a compact structure on the housing of the lamp 20, having a light-transmitting water-proof window and containing therein light sensing means and a signal conversion circuit connected to the light-emitting unit 22.

FIGS. 4A and 4B show how the cable 30 is connected to the input port 21 of the lamp 20. According to the illustrated example, the input port 21 is formed by detachably attaching a photosensing unit 40 in the form of an adaptor to an electrical connector part 210 of a conventional kind on the lamp housing for connecting a cable for transmitting electrical signals to a flash lamp of a conventional kind.

The photosensing unit 40 has a rotatable ring 41 with a female screw 42 on its inner surface. The electrical connector part 210 of the lamp 20 has a tubular structure around contact terminals 212 on the outer surface of the housing structure of the lamp 20. A matching male screw 215 is formed outside this tubular structure and engages with the female screw 42 on the photosensing unit 40. As the photosensing unit 40 is thus attached to the connector part 210 of the lamp housing, terminals of the electronic circuit inside the photosensing unit 40 (as shown in FIG. 6 by symbols DC+, S1 and S2) become electrically connected to the aforementioned contact terminals 212. Numeral 43 indicates an O-ring made, for example, of a rubber material for securing a water-tight sealing between the connector part 210 and the photosensing unit 40.

The photosensing unit 40 is a small unit about the size of a thumb. It includes a light-receiving part having light sensors 45 and 46 (referred to above as "light-sensing means") each behind a light-transmitting water-proof window made, for example, of a transparent resin material as a resin-injected protrusion, as well as a signal conversion circuit (shown at 47 in FIG. 7 but not in FIGS. 4A and 4B) for generating an electrical signal for causing the light-emitting unit 22 to emit light on the basis of a light signal received at the light-receiving part. The light sensors 45 and 46 may be fastened to and supported by a circuit board. One of these light sensors (45) is so disposed for the purpose of detecting light received only through the optical cable 30, and the other light sensor (46) is so disposed for the purpose of detecting external light in the forward direction. Depending on the type and capability of available light sensors, it is possible to use only one light sensor for both purposes. When the detection area is relatively wide, or when the sensitivity is too high such that the sensing becomes unstable, a detachable and/or rotatable cap may be provided such that a portion of the window can be covered and only light from limited directions can be detected.

The cable 30 may comprise a plastic optical fiber, at one end of which is a connector 31 for connecting to the input port 21 of the lamp 20, having a cover 32 made of a non-transparent material such as rubber, a metal or a plastic material, as shown in FIGS. 4A and 4B. At the opposite end of the cable 30 is another connector 36 for connecting the cable 30 to the camera unit 15, or to its optical signal transmitting part 151, as shown in FIGS. 5A and 5B. If a sufficiently flexible plastic material is used for the optical fiber, the cable 30 may be formed in an extendable coiled form.

FIGS. 5A and 5B show how the cable 30 is attached to the camera unit 15 (or to the camera housing). The connector 36 of the cable 30 to the camera unit 15 is structured similarly to the connector 31 to the lamp 20, having also a cover 37 made of a non-transparent material. Both of these covers 32 and 37 are provided with a plastic member which can be engagingly affixed to the connector part 210 of the lamp housing or the output port 16 of the camera unit 15 easily by a single touch of the hand.

As shown in FIGS. 5A and 5B, the output port 16 of the camera unit 15 includes a light signal emitter 161 for transmitting an optical control signal to the flash lamp 20 for starting and stopping emission of light. This light signal emitter 161 may include a light-emitting diode or a light guide extended from a separate internally located light-emitting means. Every camera adapted to be used for flash photography is provided with a terminal (known by some as "the X-terminal" but herein referred to as "the electrical signal outputting terminal" of the camera unit) for outputting an electrical control signal to a flash unit of a conventional kind which may be attached.

Both the signal transmitted through the cable 30 to the main lamp 20 and the light signal received by the slave 20' (through its light sensor 46) are quickly rising signals. When such a light signal with a quick rise is detected by either of the light sensors 45 and 46, it is converted into an electrical signal for starting light emission, amplified and then transmitted to the light-emitting unit 22 of the lamp 20. After a certain time interval such as 2–3 milliseconds, depending on how the camera was set, either a stop signal transmitted through the cable 30 for stopping the light emission is detected by the light sensor 45 or the end of the light emission from the main is detected by the light sensor 46 as a suddenly falling light signal. When such a light signal with a sudden fall is detected by either of the light sensors 45 and 46, this is converted into an electrical signal, amplified and transmitted to the light emitting unit 22 of the lamp 20. The light signal outputted from the light signal emitting part 16 of the camera unit 15 is weak, such as light from a light-emitting diode. This light signal is transmitted through the optical cable 30 to the lamp 20 such that attenuation can be prevented. The photosensing unit 40 does not require an independent power supply unit. When the flash lamp 20 has been charged up and enters into a stand-by status, a signal indicative of this condition (referred to as "the ready signal") is outputted. This signal may be captured by a capacitor and used by the photosensing unit 40 as its energy source.

FIG. 6 shows the circuit structure of the photosensing unit 40. When either of the light sensors 45 and 46 detects a rapidly rising light signal, a positive voltage is generated across resistor 403 and this voltage is amplified by amplifier 406 and outputted through terminal S1 to the flash lamp 20 as its start signal, thereby activating its light-emitting circuit (not shown) to start emission of light from its light-emitting unit 22. When a rapidly falling signal is detected, say, 2–3 milliseconds later, by the same light sensor 45 or 46, a rapidly falling negative signal is generated by a differential circuit formed with capacitor 402 and resistor 404. This is amplified by amplifier 405, which is set so as to function only on negative signals, and is outputted through terminal S2 to the flash lamp 20 as its stop signal, thereby deactivating the light-emitting circuit to stop the light emission from its light-emitting unit 22.

The travel routes of signals from the camera to the lamps of the system 10 shown in FIG. 1 are explained next with reference to FIG. 7 wherein the camera unit 15 is shown, although schematically, as consisting of a camera 150 and its housing 151. FIG. 8 shows schematically the signal forms (or signal patterns) along the signal travel routes described in FIG. 7. The vertical axes in FIG. 8 represent either the voltage in the case of an electrical signal and light intensity in the case of a light signal, the horizontal axes representing the time. The aforementioned electrical signal outputting terminal of the camera 150 is schematically shown at 152.

When the camera 150 is clicked, an electrical flash control signal E1 is outputted from the electrical signal outputting terminal 152. This flash control signal E1 is characterized, although it depends on the type of the individual camera, as having two strong pulses, the first one indicating the time to start light emission and the second indicating the time to end the light emission from the lamp 20. The flash control signal E1 is received by a signal converting circuit 153 inside the camera housing 151 and converted thereby into an LED-controlling electrical signal E2 which is received by the light signal emitter 161 (such as a light-emitting diode) inside the output port 16 of the camera unit 15. The light signal emitter 161 thereupon emits a light signal L1, causing it to travel to the photosensing unit 40 of the flash lamp 20 through the optical cable 30 to which it is coupled through the connector 36 as shown in FIG. 5B. This light signal L1 is detected by the light sensor 45 inside the photosensing unit 40 and is converted back into an electrical signal E3 which is further converted, as described above with reference to FIG. 6, into a lighting-controlling electrical signal E4 by a signal conversion circuit 47 and is transmitted to the light-emitting unit 22 of the flash lamp 20 serving as the main.

In a two-lamp system as shown in FIG. 1, the light emitted from the main 20 is received as light signal L2 by the light sensor 46 of the photosensing unit 40 of the slave 20' and this light signal L2 is similarly converted into an electrical signal E3, which is then converted into another electrical signal E4 by a signal conversion circuit 47 inside its photosensing unit 40 and transmitted to the light-emitting unit 22 of the (slave) flash lamp 20'.

The invention has been described above by way of only one example, but this example is not intended to limit the scope of the invention. Many modifications and variations are possible within the scope of the invention. For example, the light signal emitter 161 may itself be a flash lamp incorporated in the camera unit 15, serving not only to directly illuminate the target object to be photographed but also to use a part of this flash light as an optical signal to be received by a slave such that a two-lamp system comparable to the one shown in FIG. 1 can be established.

In summary, a flash lamp according to this invention is characterized not only as being usable both as a main and as a slave but also wherein an optical cable (say, comprising an optical fiber) is used, when the lamp is being used as a main, to link it with the optical signal transmitting part of the camera, a non-transparent material covering their connecting part. When it is used as a sleeve, emitted light from the main is received by a light sensor exposed to the exterior. A lamp which is being used as a main can quickly change its role to be used as a slave merely by removing the cable provided with a light-screening cover.

What is claimed is:

1. A flash lamp for use both as a main and as a slave with a camera unit including a camera, said flash lamp comprising:
   a main housing which contains a flash light outputting part;
   a light signal receiving part on said main housing, said light signal receiving part being detachably connectable to an optical cable for transmitting optical signals therethrough, said light signal receiving part having a transparent water-proof window and light sensor means inside said window for sensing light only through said optical cable when said optical cable is attached to said light signal receiving part, sensing light received through said window when said optical cable is detached from said light signal receiving part, and outputting an electrical detection signal in response to said sensed light; and
   a signal conversion circuit for receiving said detection signal from said light signal receiving part and transmitting a flash control signal to said flash light outputting part to control light output from said flash light outputting part.

2. The flash lamp of claim 1 wherein said signal conversion circuit detects a sudden rise and a sudden fall of said sensed light.

3. A combined system for underwater photography comprising:
   a flash lamp;
   a camera including an electrical signal emitting terminal which transmits an electrical flash-activating signal towards said flash lamp when said camera is clicked for exposure; and
   a camera housing which contains said camera therein, is detachably connectable to said flash lamp and includes a signal converting circuit for receiving said flash-activating signal and correspondingly outputting a converted electrical signal and a cable connector for attaching said camera housing with an optical cable, said cable connector containing therein a light source for emitting a light signal through said optical cable in response to said converted electrical signal from said signal converting circuit; wherein said flash lamp comprises:
   a main housing which contains a flash light outputting part;
   a light signal receiving part on said main housing, said light signal receiving part being detachably connectable to an optical cable for transmitting optical signals therethrough, said light signal receiving part having a transparent water-proof window and light sensor means inside said window for sensing light only through said optical cable when said optical cable is attached to said light signal receiving part, sensing light received through said window when said optical cable is detached from said light signal receiving part, and outputting an electrical detection signal in response to said sensed light; and
   a signal conversion circuit for receiving said detection signal from said light signal receiving part and transmitting a flash control signal to said flash light outputting part to control light output from said flash light outputting part.

4. The combined system of claim 3 wherein said light source comprises a light-emitting diode.

5. The combined system of claim 3 wherein said flash-activating signal has two pulses separated by an intended time of exposure.

* * * * *